United States Patent
Wang et al.

(10) Patent No.: US 12,267,036 B2
(45) Date of Patent: Apr. 1, 2025

(54) METHOD AND SYSTEM FOR CONTROLLING FAN, AND ELECTRONIC DEVICE EMPLOYING METHOD

(71) Applicants: CHAMP TECH OPTICAL (FOSHAN) CORPORATION, Foshan (CN); Foxconn Technology Co., Ltd., New Taipei (TW)

(72) Inventors: Kuan-Ming Wang, New Taipei (TW); Yung-Ping Lin, New Taipei (TW); Po-Tsun Kuo, New Taipei (TW)

(73) Assignees: CHAMP TECH OPTICAL (FOSHAN) CORPORATION, Foshan (CN); Foxconn Technology Co., Ltd., New Taipei (TW)

( * ) Notice: Subject to any disclaimer, the term of this patent is extended or adjusted under 35 U.S.C. 154(b) by 104 days.

(21) Appl. No.: 18/235,625

(22) Filed: Aug. 18, 2023

(65) Prior Publication Data

US 2025/0030359 A1    Jan. 23, 2025

(30) Foreign Application Priority Data

Jul. 19, 2023    (CN) .......................... 202310892595.5

(51) Int. Cl.
*H02P 7/29*    (2016.01)
*F04D 27/00*   (2006.01)

(52) U.S. Cl.
CPC .......... *H02P 7/2913* (2013.01); *F04D 27/004* (2013.01)

(58) Field of Classification Search
CPC ........ H02P 27/08; H02P 27/06; H02P 27/085; H02P 29/60; H02P 29/68; H02P 7/29; H02P 7/265; H02P 23/0027; H02P 23/28; H02P 25/00; H02P 25/024; H02P 25/032; H02P 25/062; H02P 25/064; H02P 25/03; H02P 6/06; H02P 6/08; H02P 6/24; H02P 3/00; H02P 3/06; H02P 3/18; H02P 1/30; H02P 1/42; H02P 1/46; H02P 1/54; H02P 2209/09

See application file for complete search history.

(56) References Cited

U.S. PATENT DOCUMENTS 9,083,265 B1 *    7/2015   Maroney .................. H02P 5/50

FOREIGN PATENT DOCUMENTS

| CN | 114263629 | 4/2022 |
| CN | 114265488 | 4/2022 |
| TW | 202231999 | 8/2022 |

* cited by examiner

*Primary Examiner* — Antony M Paul
(74) *Attorney, Agent, or Firm* — ScienBiziP, P.C.

(57) ABSTRACT

A method for controlling fans arranged in different working areas comprises: presetting a plurality of fan operation frequencies, receiving a fan operation request and adjusting a frequency of a pulse width modulation (PWM) controller to a first objective frequency based on the fan operation request, and sending the first objective frequency to the fans arranged in different working areas, to drive a first fan arranged in a first objective working area to run. Each of the plurality of fan operation frequencies corresponds to different working areas, the first objective frequency is one of the plurality of fan operation frequencies, and the first objective working area is one of the plurality of working areas corresponding to the first objective frequency. A system for controlling fans and an electronic device are also disclosed.

15 Claims, 8 Drawing Sheets

| Start code | Item-tens digit | Item-ones digit | Data-ten thousands digit | Data-thousands digit | Data-hundreds digit | Data-tens digit | Data-ones digit | End code |

| Start code | DUTY=95% |
|---|---|
| Item | 01:current<br>02:voltage<br>03:power<br>04:company name<br>05:product model<br>06:running time<br>07:fault code<br>08:temperature<br>09:program version |
| Data | DUTY: 10%=number 0; 15%=number 1; 20%=number 2; 30%=number 3; 40%=number 4;<br>50%=number 5; 60%=number 6; 70%=number 7; 80%=number 8; 90%=number 9 |
| End code | DUTY=5% |

METHOD AND SYSTEM FOR CONTROLLING FAN, AND ELECTRONIC DEVICE EMPLOYING METHOD

TECHNICAL FIELD

The subject matter herein generally relates to electronic devices employing fans.

BACKGROUND

With the development of electronic technology, functions of electronic devices are becoming more and more powerful, and a large amount of heat will be generated during the operation of the electronic devices. An operating temperature of an electronic devices has a range, beyond this range, a working state of the electronic devices will become unstable, and may even cause the electronic device to catch fire. A fan controlled by pulse width modulation (PWM) signals is commonly used. The fan is controlled by a controller sending PWM signals with different duty cycles to achieve speed control, the speed of the fan is flexibly controlled so that the fan can work in a specified speed, not running at full speed constantly, thereby effectively reduce a power consumption and noise produced by the electronic device. When the electronic device comprises multiple working areas, each of the multiple working areas is provided with a fan, it may be difficult to achieve fan control in different working areas.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

A pulse width modulation (PWM) technology refers to use a digital output of a microprocessor to control a analog circuit, and is a method of digitally encoding analog signal levels. Controlling an analog circuitry digitally can significantly reduce a cost and a power consumption of an electronic device.

Figure 1:
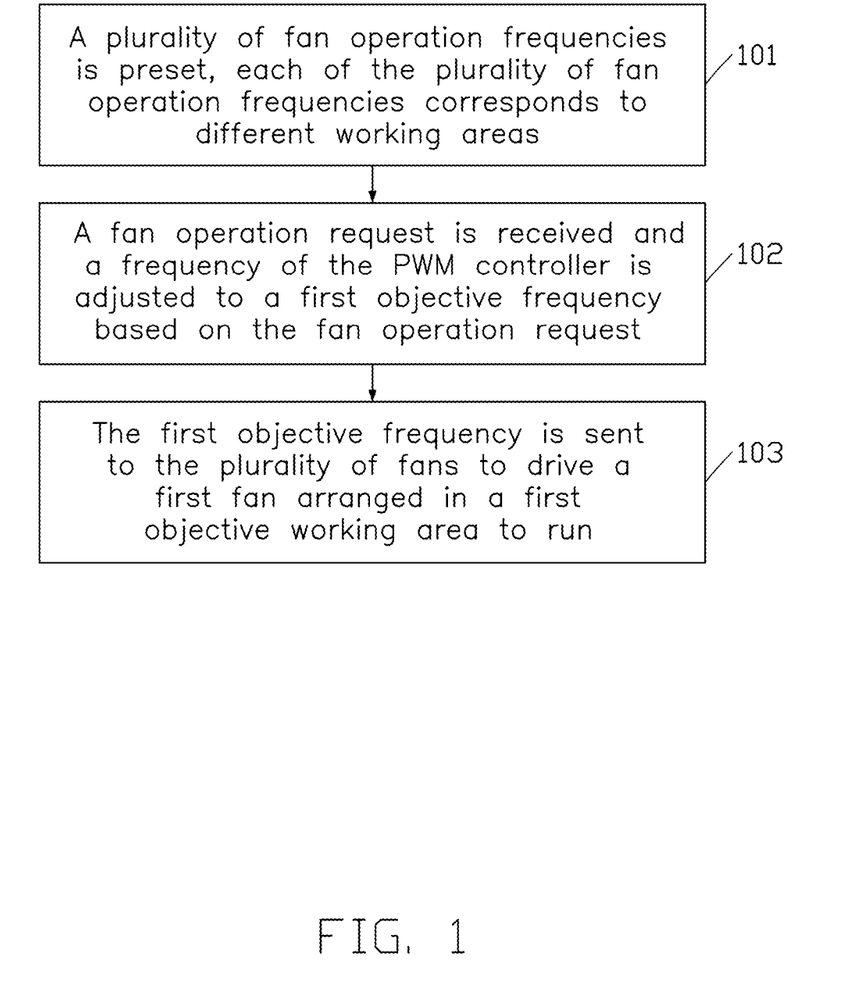
FIG. 1 is a flowchart of an embodiment of a method for controlling fans.

FIG. 1 illustrates one exemplary embodiment of a method for controlling fans, the method can be applied to a control device, the control device comprises a PWM controller, and the control device is configured to control a plurality of fans arranged in a plurality of working areas. Each of the plurality of working areas may comprise one or more fans, and the fans in the same working area can correspond the same operating parameters. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 101.

In block 101, a plurality of fan operation frequencies is preset, each of the plurality of fan operation frequencies corresponds to different working areas.

In one embodiment, a value of a fan operating frequency corresponding to a fan arranged in each of the plurality of working areas can be set according to an actual application.

In one embodiment, the number of the fan operation frequencies is not limited, and can be set according to the actual application.

In one embodiment, the number of working areas corresponding to each of the plurality of fan operation frequencies is not limited. For example, a fan operating frequency can correspond to a fan arranged in a working area, and another fan operating frequency can correspond to fans in multiple other working areas.

In block 102, a fan operation request is received and a frequency of the PWM controller is adjusted to a first objective frequency based on the fan operation request.

In one embodiment, the first objective frequency is one of the plurality of fan operation frequencies.

For example, if a fan arranged in a working area needs to run, the fan arranged in the working area may send a fan operation request to the control device, and the control device adjusts the frequency of the PWM controller to the first objective frequency corresponding to the fan arranged in the working area based on the fan operation request.

The control device may also adjusts the frequency of the PWM controller to the first objective frequency corresponding to the fan arranged in the working area based on sensing signals of temperature sensors. For example, each of the plurality of working areas configures a temperature sensor, the control device can adjust the frequency of the PWM controller based on the sensing signals of the temperature sensors.

In block 103, the first objective frequency (a signal with the first objective frequency) is sent to the plurality of fans to drive a first fan arranged in a first objective working area to run.

In one embodiment, the first objective working area is one of the plurality of working areas corresponding to the first objective frequency.

In one embodiment, the plurality of working areas can comprise a first working area, a second working area, and a third working area, the plurality of fan operation frequencies can comprise a first fan operation frequency, a second fan operation frequency, a third fan operation frequency, and a fourth fan operation frequency. The frequency of the PWM controller can be adjusted to the first fan operation frequency, and a fan arranged in the first working area can be drove to run based on the first fan operation frequency. The frequency of the PWM controller can be adjusted to the second fan operation frequency, and a fan arranged in the second working area can be drove to run based on the second fan operation frequency. The frequency of the PWM controller can be adjusted to the third fan operation frequency, and a fan arranged in the third working area can be drove to run based on the third fan operation frequency. The frequency of the PWM controller can be adjusted to the fourth fan operation frequency, and fans in the first working area, the second working area, and the third working area can be drove to run based on the fourth fan operation frequency.

Figure 2:
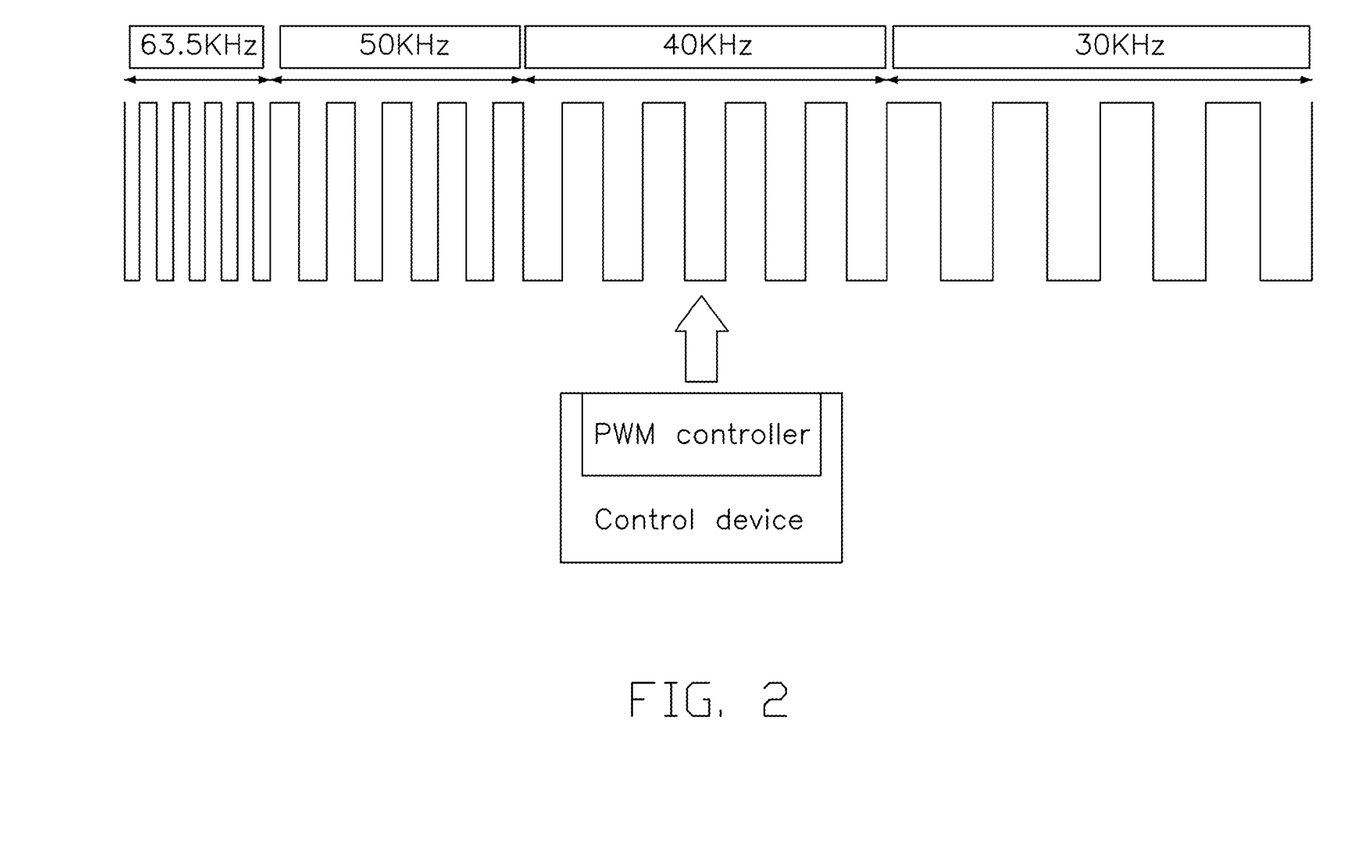
FIG. 2 is an application scenario diagram of an embodiment of the method of FIG. 1.
Figure 3:
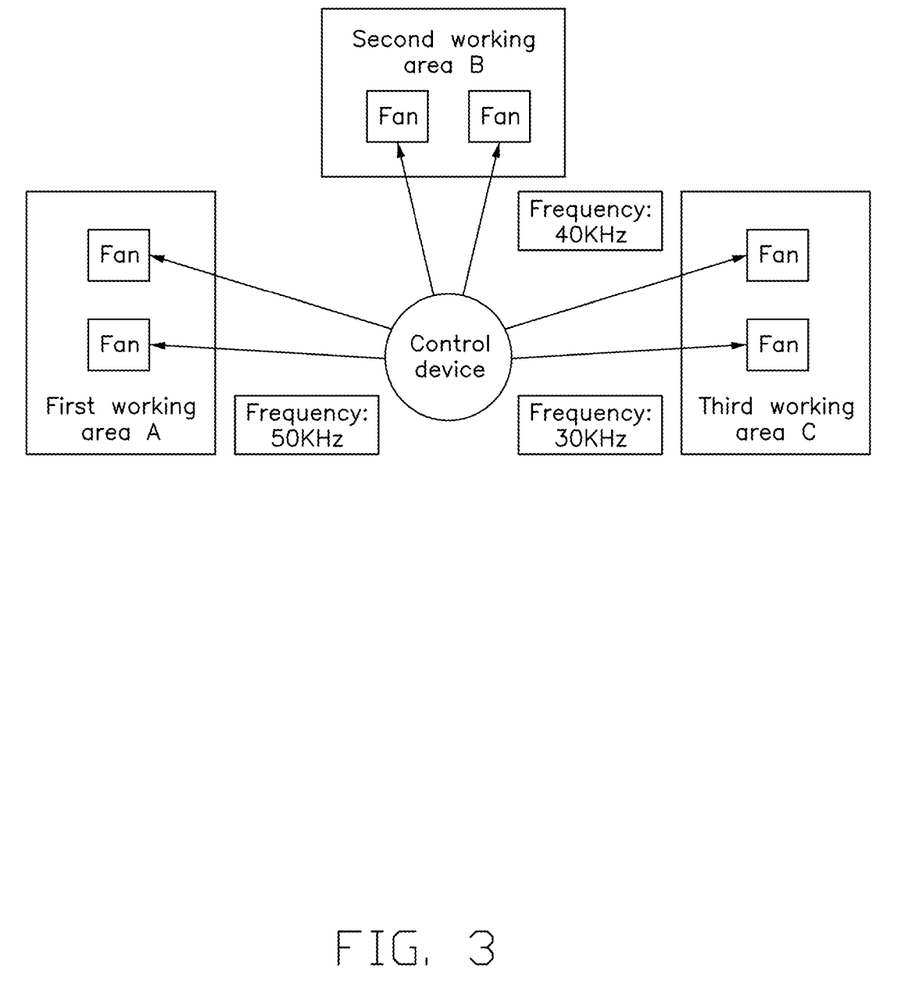
FIG. 3 is an application scenario diagram of another embodiment of the method of FIG. 1.

Referring to FIGS. 2 and 3, the first fan operation frequency is 50 KHz, the second fan operation frequency is 40 KHz, the third fan operation frequency is 30 KHz, and a fourth fan operation frequency is 62.5 KHz as an example.

When the frequency of the PWM controller is adjusted to 62.5 KHz, the fans arranged in the first work area A, the second work area B, and the third work area C are all running. When the frequency of the PWM controller is adjusted to 50 KHz, only the fan arranged in the first working area A is running, and the fans in other working areas (the second work area B and the third work area C) are not running. When the frequency of the PWM controller is adjusted to 40 KHz, only the fan arranged in the second working area B is running, and the fans in other working areas (the first work area A and the third work area C) are not running. When the frequency of the PWM controller is adjusted to 30 KHz, only the fan arranged in the third working area C is running, and the fans in other working areas (the first work area A and the second work area B) are not running.

In one embodiment, when the frequency of the PWM controller is changed, previously running fans in the working areas can be set to continue running or to stop running. For example, if the frequency of the PWM controller is adjusted to 50 KHz, the fan arranged in the first working area A is drove to run, if the frequency of the PWM controller is adjusted to 30 KHz, the fan arranged in the third working area C is drove to run, and the fan arranged in the first working area A can be set to continue running or set to stop running.

In one embodiment, a plurality of fan stop frequencies can be preset, each of the plurality of fan stop frequencies corresponds to different working areas. For example, one fan stop frequency can correspond to a fan arranged in a working area, and another fan stop frequency can correspond to fans in multiple other working areas. If a fan stop request is received, the frequency of the PWM controller can be adjusted to a second objective frequency based on the fan stop request, and the second objective frequency is one of the plurality of fan operation frequencies. The second objective frequency is sent to the plurality of fans to stop a second fan arranged in a second objective working area, and the second objective working area is one of the plurality of working areas corresponding to the second objective frequency.

For example, the plurality of fan stop frequencies comprise 55 KHz, 45 KHz, and 35 KHz, the 55 KHz corresponds to the fan in the first working area A, the 45 KHz corresponds to the fan in the second working area B, and the 35 KHz corresponds to the fan in the third working area C. If the frequency of the PWM controller is adjusted to 55 KHz, the fan in the first work area A is controlled to stop running. If the frequency of the PWM controller is adjusted to 45 KHz, the fan in the second work area B is controlled to stop running. If the frequency of the PWM controller is adjusted to 35 KHz, the fan in the third work area C is controlled to stop running.

Compared with the related technology, the embodiments of the present application comprise at least the following advantages: by presetting the plurality of fan operating frequencies, and each of the plurality of fan operating frequencies corresponds to different working areas, if the fan in the first objective working area is required to run, the frequency of the PWM controller is adjusted to the first objective frequency, and the first objective frequency corresponds to the fan in the first objective working area, the fan in the first objective working area can be drove to run. In this way, device capabilities can be improved by changing the frequency of the PWM controller to make the fans in different working areas running.

Figure 4:
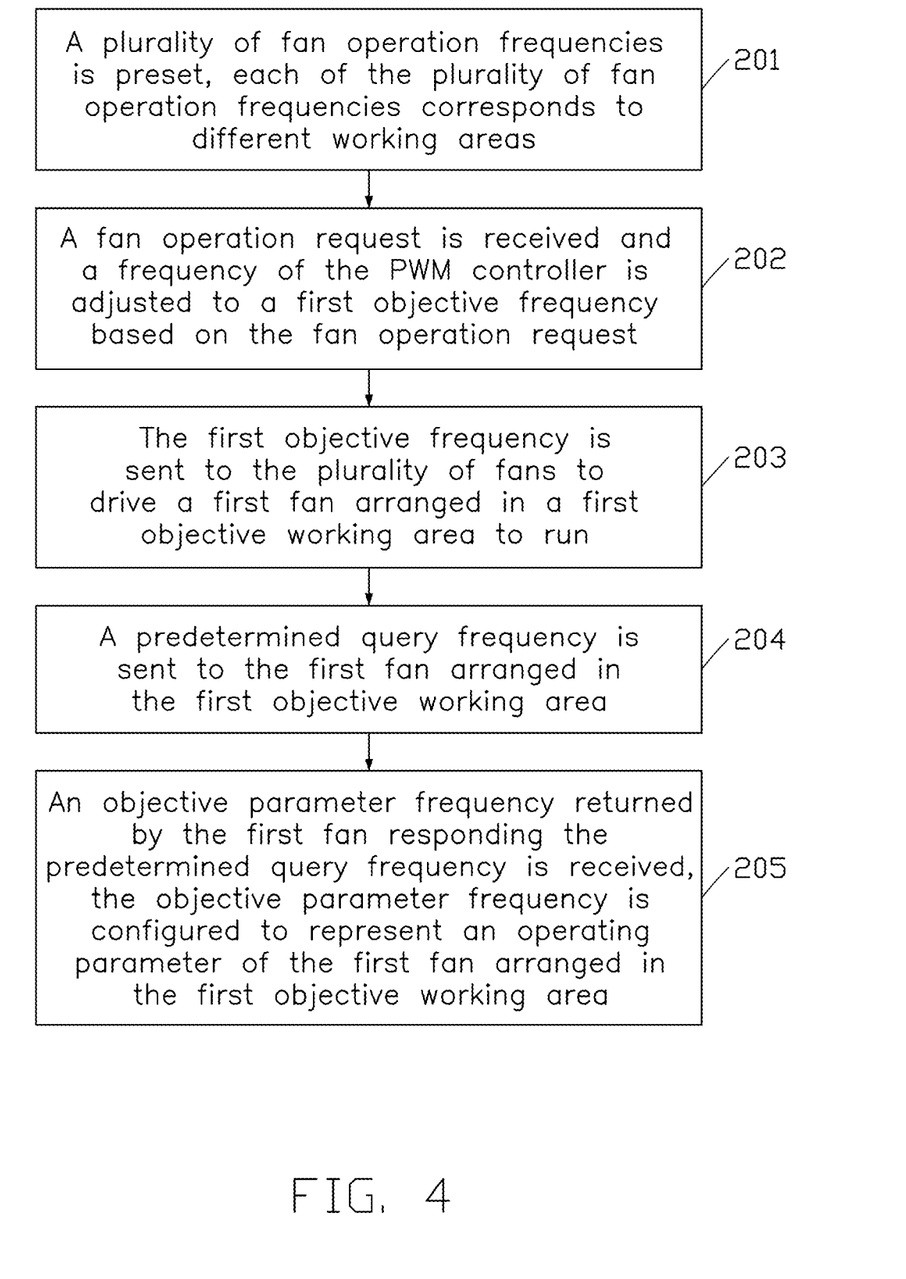
FIG. 4 is a flowchart of another embodiment of a method for controlling fans.

FIG. 4 illustrates another exemplary embodiment of a method for controlling fans, compared with FIG. 1, the main improvement comprises: sending a predetermined query frequency to the first fan arranged in the first objective working area after sending the first objective frequency to the plurality of fans; receiving an objective parameter frequency returned by the first fan responding the predetermined query frequency. The objective parameter frequency is configured to represent an operating parameter of the first fan arranged in the first objective working area. In this way, the operating parameters of fans can be accurately known, so as to facilitate the management and maintenance of the fans.

The exemplary method is provided by way of example, as there are a variety of ways to carry out the method. Each block shown in FIG. 4 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 201.

In block 201, a plurality of fan operation frequencies is preset, each of the plurality of fan operation frequencies corresponds to different working areas.

In block 202, a fan operation request is received and a frequency of the PWM controller is adjusted to a first objective frequency based on the fan operation request.

In block 203, the first objective frequency is sent to the plurality of fans to drive a first fan arranged in a first objective working area to run.

Blocks 201, 202, and 203 of FIG. 4 are similar to Blocks 101, 102, and 103 of FIG. 1, the detailed description of the blocks 201, 202, and 203 are not be repeated herein.

In block 204, a predetermined query frequency is sent to the first fan arranged in the first objective working area.

In one embodiment, the frequency of the PWM controller can be adjusted to the predetermined query frequency, and the PWM controller can send the predetermined query frequency to the fan(s) of the first objective working area.

In block 205, an objective parameter frequency returned by the first fan responding the predetermined query frequency is received, the objective parameter frequency is configured to represent an operating parameter of the first fan arranged in the first objective working area.

In one embodiment, the operating parameter may comprise N categories, and N is an integer greater than 1. The predetermined query frequency may comprise N query frequencies, each of the N query frequencies can correspond to one category of operating parameter. The block of receiving the objective parameter frequency returned by the first fan responding the predetermined query frequency may comprise: receiving the objective parameter frequency returned by the first fan, the operating parameter represented by the objective parameter frequency corresponds to the predetermined query frequency.

In one embodiment, the block of receiving the objective parameter frequency returned by the first fan may comprises: generating a first frequency band by the first fan based on a category of the operating parameter corresponding to the predetermined query frequency; generating a second frequency band by the first fan based on an operating parameter data of the first fan under the category; and generating the objective parameter frequency by the first fan based on the first frequency band and the second frequency band, and sending the objective parameter frequency to the control device. For example, the category of the operating parameter is category c1, the second frequency band can be generated by the first fan based on an operating parameter data of the first fan under the category c1.

In one embodiment, the categories of operating parameter are selected from a group consisting of a current, a voltage, a power, a company name, a product model, a running time, a fault code, a temperature, and a program version of a fan.

In one embodiment, different categories of operating parameters can correspond to different predetermined query frequencies, and if the control device queries the operating parameters of the same category of fans arranged in different working areas, the corresponding predetermined query frequencies are also different.

For example, the predetermined query frequency is define as 12 KHz and 22 KHz. If the frequency of the PWM controller is adjusted to 12 KHz, representing to query a current of the fan arranged in the first working area A. If the frequency of the PWM controller is adjusted to 22 KHz, representing to query a current of the fan arranged in the second working area B.

Figure 5:
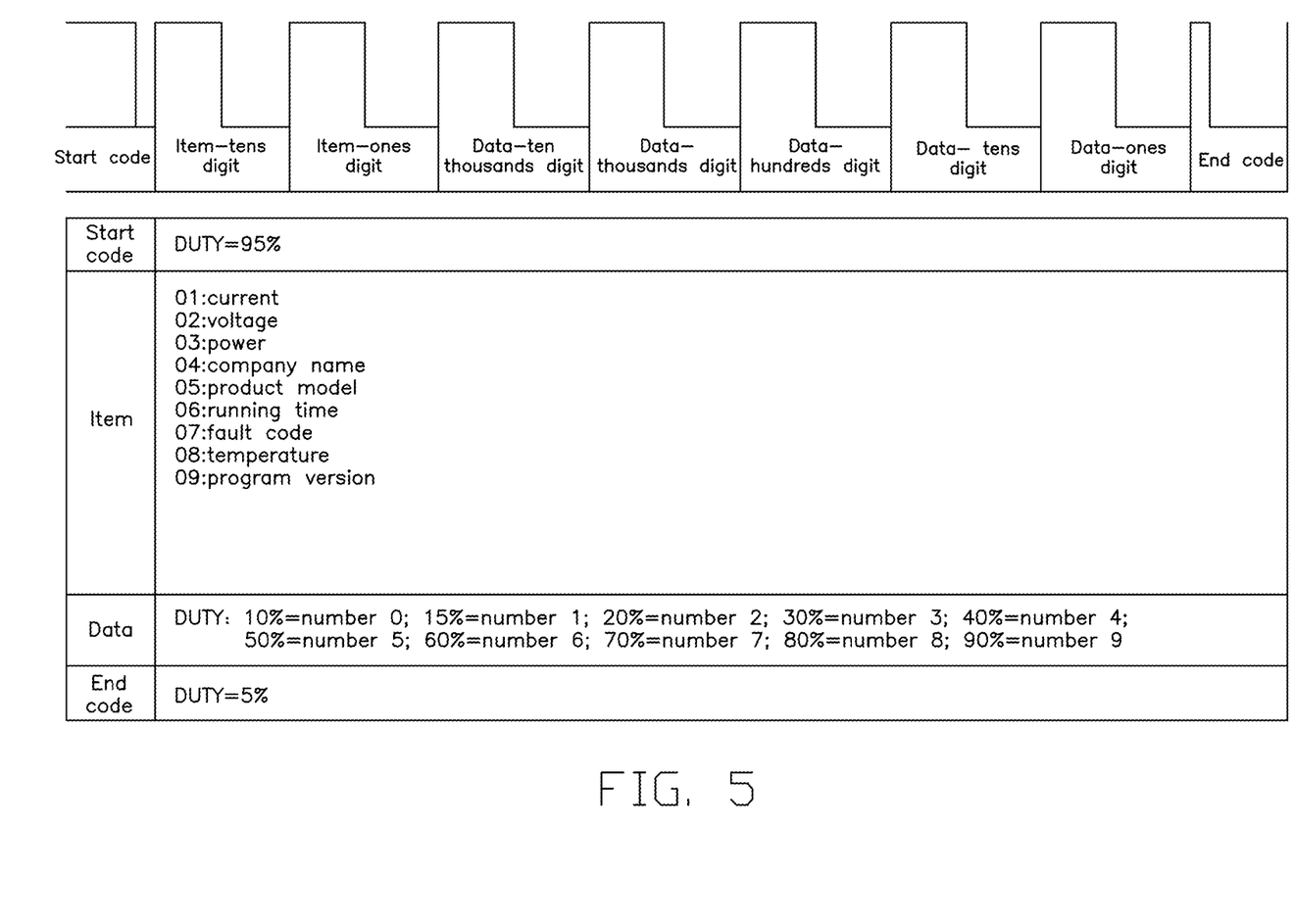
FIG. 5 is a data transmission diagram of an embodiment of a fan.
Figure 6:
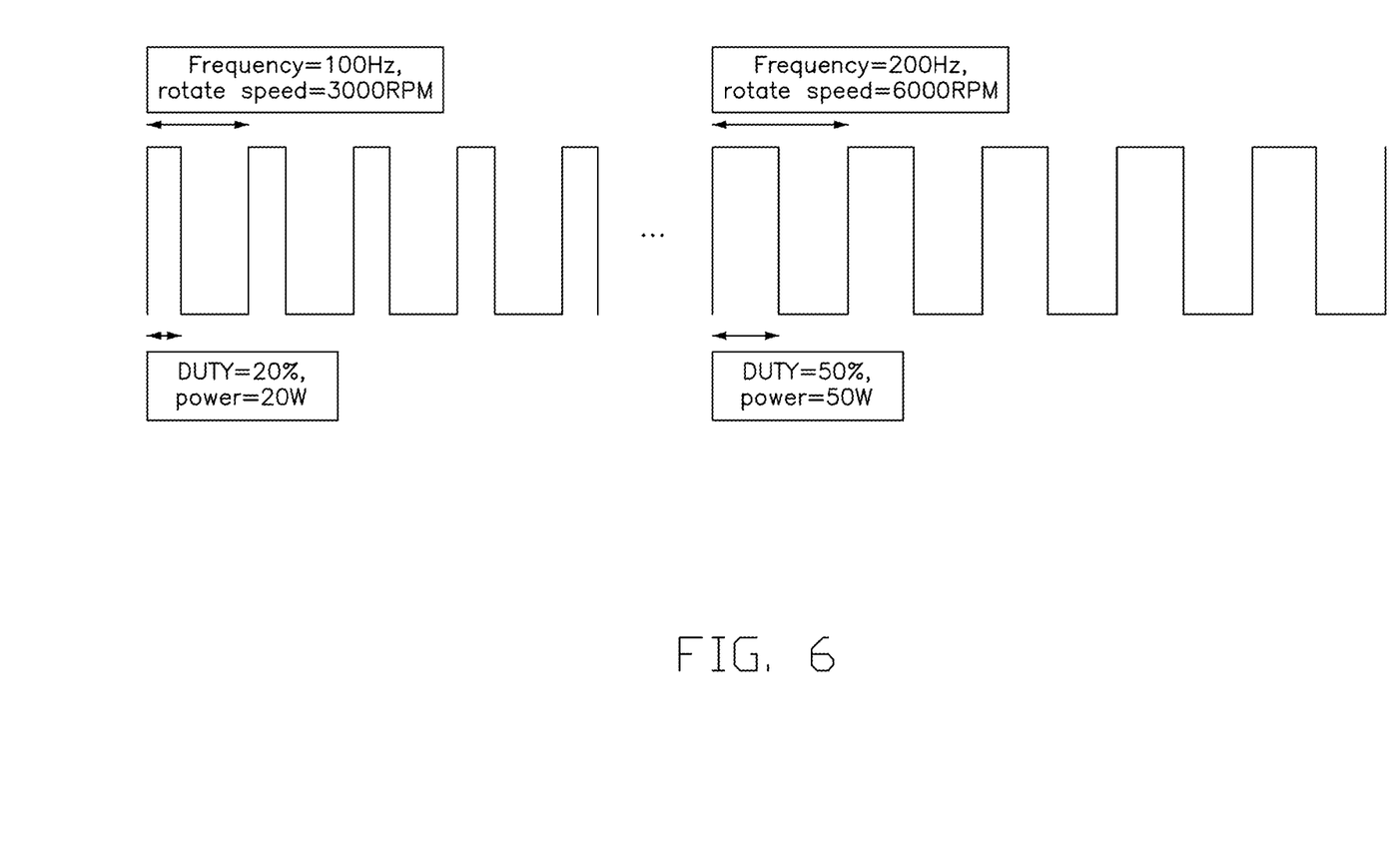
FIG. 6 is a frequency diagram of an embodiment of a fan.

Combined with FIGS. 5 and 6 to describe how the fans feedback operating parameters to the control device.

Referring to FIG. 5, the operating parameters comprise nine items: current 01, voltage 02, power 03, company name 04, product model 05, running time 06, fault code 07, temperature 08, and program version 09. A value of the duty cycle DUTY can be used to characterize different numbers and start/end codes. For example duty cycle 10%=number 0; duty cycle 15%=number 1; duty cycle 20%=number 2; duty cycle 30%=number 3; duty cycle 40%=number 4; duty cycle 50%=number 5; duty cycle 60%=number 6; duty cycle 70%=number 7; duty cycle 80%=number 8; duty cycle 90%=number 9; duty cycle 95%=start code; duty cycle 5%=end code.

If a current of a fan needs to query, setting the duty cycle of tens digit of item to 10% and the duty cycle of ones digit of item to 15% after setting the duty cycle of the starting code to 95%, to represent current 01; if the current of the fan is 3 A, setting the duty cycle of ten thousands digit of data to 10%, the duty cycle of thousands digit of data to 10%, the duty cycle of hundreds digit of data to 10%, the duty cycle of tens digit of data to 10%, and the duty cycle of ones digit of data to 30%. In this way, the fan can feedback the current of the fan being 3 A to the control device.

As shown in FIG. 6, changing the duty cycle of the PWM controller does not affect the reading of a rotate speed of the fan.

Figure 7:
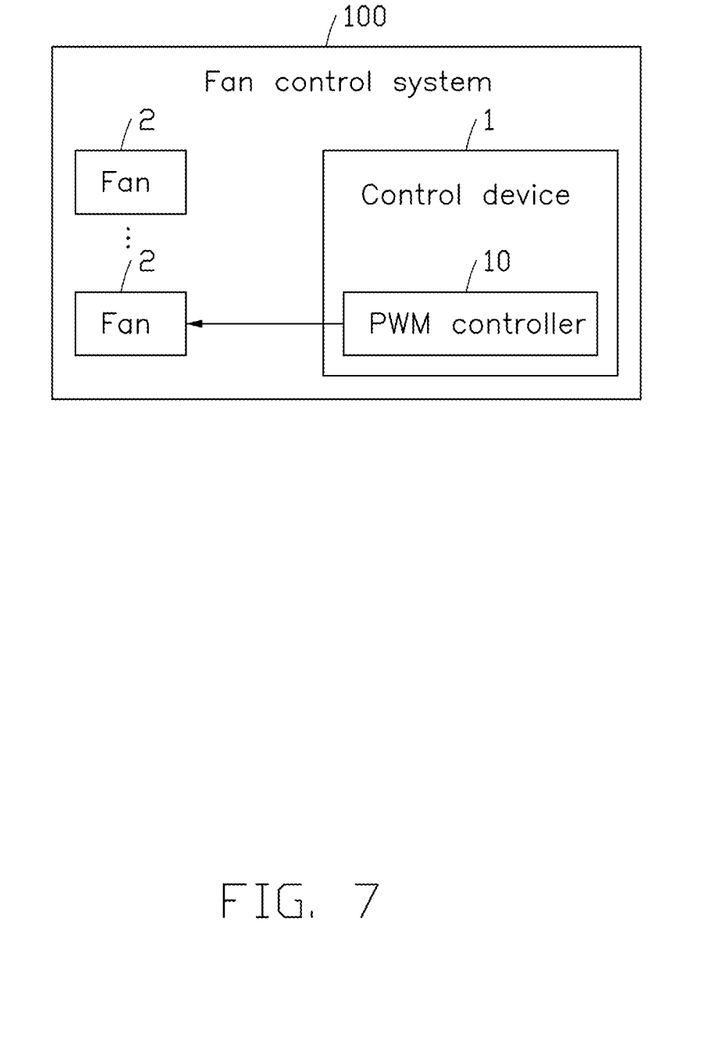
FIG. 7 is a block diagram of an embodiment of a fan control system.

Referring to FIG. 7, a fan control system 100 may comprise a control device 1 and a plurality of fans 2. The plurality of fans 2 are arranged in different working areas, and the control device is configured to control the plurality of fans 2 arranged in different working areas. The control device 1 comprises a PWM controller 10. The control device 1 is configured to preset a plurality of fan operation frequencies, each of the plurality of fan operation frequencies corresponds to different working areas. The control device 1 is further configured to receive a fan operation request and adjust a frequency of the PWM controller 10 to a first objective frequency based on the fan operation request, and the first objective frequency is one of the plurality of fan operation frequencies. The control device 1 is further configured to send the first objective frequency to the plurality of fans 2 arranged in different working areas, a fan 2 arranged in a first objective working area can be drove to run based on the first objective frequency, and the first objective working area is one of the plurality of working areas corresponding to the first objective frequency.

Figure 8:
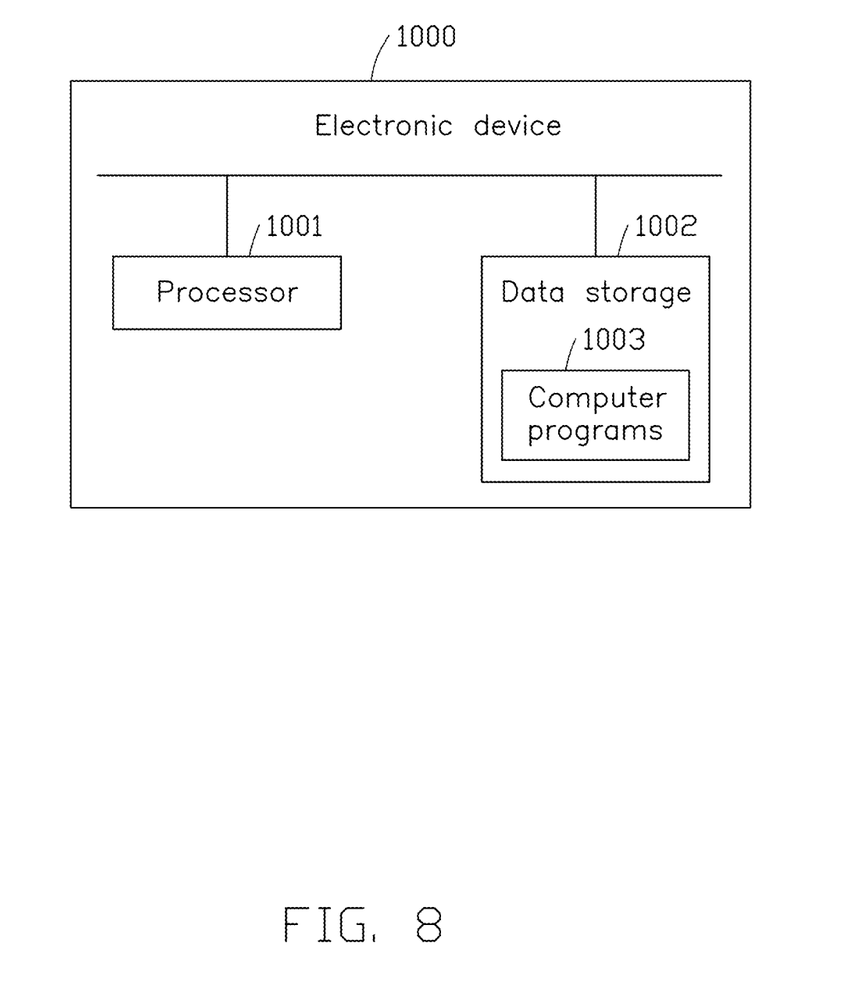
FIG. 8 is an architecture diagram of an embodiment of an electronic device.

Referring to FIG. 8, an electronic device 1000 may comprise a processor 1001 and a data storage 1002. The data storage 1002 is configured to store one or more computer programs 1003. The one or more computer programs 1003 are configured to be executed by the processor 1001. The one or more computer programs 1003 comprise instructions, and the instructions is capable of being executed by the electronic device 1000 to implement the method for controlling fans.

It can be understood that the structure shown in FIG. 8 does not constitute a limitation on the electronic device 1000. In other embodiments, the electronic device 1000 may comprise more or fewer components than shown in FIG. 8, or combine some components, or separate some components, or arrange different components.

The processor 1001 may comprise one or more processing units, for example, the processor 1001 may comprise an application processor (AP), a modem, a graphics processing unit (GPU), an image signal processor (ISP), a controller, a video codec, a digital signal processor (DSP), a baseband processor, and/or a neural network processing unit (NPU), etc. Different processing units may be independent components, or may be integrated in one or more processors.

A memory may also be integrated in the processor 1001 for storing instructions and data. In some embodiments, the memory integrated in processor 1001 is a cache memory. The memory may store instructions or data that the processor 1001 has just used or recycled. If the processor 1001 needs to use the instruction or data again, it can be directly recalled from the memory, and a repeated store and read is avoided. A waiting time of the processor 1001 is reduced, and an efficiency of the system is improved.

In one embodiment, the processor 1001 may comprise one or more interfaces. The interfaces may comprise an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface, etc.

In one embodiment, the data storage 1002 may comprise a high-speed random access memory, and may also comprise a non-volatile memory, such as a hard disk, an internal memory, a plug-in hard disk, a smart media card (SMC), a secure digital (SD) card, a flash card, at least one magnetic disk memory, a flash memory, or other non-volatile solid-state memory.

In one embodiment, a non-transitory storage medium recording instructions is also provided. When the recorded computer instructions are executed by a processor of the electronic device 1000, the electronic device 1000 can perform the method for controlling fans.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A fan control method applied to a control device, the control device being provided with a pulse width modulation (PWM) controller and being configured to control a plurality of fans arranged in a plurality of working areas, the fan control method comprising:
    presetting a plurality of fan operation frequencies, wherein each of the plurality of fan operation frequencies corresponds to different working areas;
    receiving a fan operation request and adjusting a frequency of the PWM controller to a first objective frequency based on the fan operation request, wherein the first objective frequency is one of the plurality of fan operation frequencies; and
    sending the first objective frequency to the plurality of fans to drive a first fan of the plurality of fans to run, wherein the first fan is arranged in a first objective working area, and the first objective working area is one of the plurality of working areas corresponding to the first objective frequency.

2. The fan control method of claim 1, wherein the plurality of working areas is provided with a first working area, a second working area, and a third working area, the plurality of fan operation frequencies is provided with a first fan operation frequency, a second fan operation frequency, a third fan operation frequency, and a fourth fan operation frequency; the fan control method further comprises:
    adjusting the frequency of the PWM controller to the first fan operation frequency and driving a fan arranged in the first working area to run based on the first fan operation frequency;
    adjusting the frequency of the PWM controller to the second fan operation frequency and driving a fan arranged in the second working area to run based on the second fan operation frequency;
    adjusting the frequency of the PWM controller to the third fan operation frequency and driving a fan arranged in the third working area to run based on the third fan operation frequency; and
    adjusting the frequency of the PWM controller to the fourth fan operation frequency and driving fans in the first working area, the second working area, and the third working area to run based on the fourth fan operation frequency.

3. The fan control method of claim 1, further comprising:
    presetting a plurality of fan stop frequencies, wherein each of the plurality of fan stop frequencies corresponds to different working areas;
    receiving a fan stop request and adjusting the frequency of the PWM controller to a second objective frequency based on the fan stop request, wherein the second objective frequency is one of the plurality of fan operation frequencies; and
    sending the second objective frequency to the plurality of fans to stop a second fan of the plurality of fans, wherein the second fan is arranged in a second objective working area, and the second objective working area is one of the plurality of working areas corresponding to the second objective frequency.

4. The fan control method of claim 1, further comprising:
    sending a predetermined query frequency to the first fan; and
    receiving an objective parameter frequency returned by the first fan responding the predetermined query frequency, wherein the objective parameter frequency is configured to represent an operating parameter of the first fan arranged in the first objective working area.

5. The fan control method of claim 4, wherein the operating parameter is provided with N categories, and N is an integer greater than 1, the predetermined query frequency is provided with N query frequencies, each of the N query frequencies corresponds to one category of operating parameter, and receiving the objective parameter frequency returned by the first fan responding the predetermined query frequency comprises:
    receiving the objective parameter frequency returned by the first fan, wherein the operating parameter represented by the objective parameter frequency corresponds to the predetermined query frequency.

6. The fan control method of claim 5, wherein receiving the objective parameter frequency returned by the first fan comprises:
    generating a first frequency band by the first fan based on a category of the operating parameter corresponding to the predetermined query frequency;
    generating a second frequency band by the first fan based on an operating parameter data of the first fan under the category; and
    generating the objective parameter frequency by the first fan based on the first frequency band and the second frequency band, and sending the objective parameter frequency to the control device.

7. The fan control method of claim 5, wherein the categories of operating parameter are selected from a group consisting of a current, a voltage, a power, a company name, a product model, a running time, a fault code, a temperature, and a program version.

8. A fan control system comprising:
    a plurality of fans arranged in a plurality of working areas; and
    a control device configured to control the plurality of fans;

wherein the control device comprises a pulse width modulation (PWM) controller, the control device is configured to preset a plurality of fan operation frequencies, each of the plurality of fan operation frequencies corresponds to different working areas, the control device is further configured to receive a fan operation request and adjust a frequency of the PWM controller to a first objective frequency based on the fan operation request, the first objective frequency is one of the plurality of fan operation frequencies, the control device is further configured to send the first objective frequency to the plurality of fans, a fan arranged in a first objective working area is drove to run based on the first objective frequency, and the first objective working area is one of the plurality of working areas corresponding to the first objective frequency.

9. An electronic device comprising:
a pulse width modulation (PWM) controller;
a plurality of fans arranged in a plurality of working areas;
at least one processor; and
a data storage storing one or more programs which when executed by the at least one processor, cause the at least one processor to:
preset a plurality of fan operation frequencies, wherein each of the plurality of fan operation frequencies corresponds to different working areas;
receive a fan operation request and adjust a frequency of the PWM controller to a first objective frequency based on the fan operation request, wherein the first objective frequency is one of the plurality of fan operation frequencies; and
send the first objective frequency to the plurality of fans to drive a first fan of the plurality of fans to run, wherein the first fan is arranged in a first objective working area, and the first objective working area is one of the plurality of working areas corresponding to the first objective frequency.

10. The electronic device of claim 9, wherein the plurality of working areas comprises a first working area, a second working area, and a third working area, the plurality of fan operation frequencies comprises a first fan operation frequency, a second fan operation frequency, a third fan operation frequency, and a fourth fan operation frequency; the at least one processor is further configured to:
adjust the frequency of the PWM controller to the first fan operation frequency and drive a fan arranged in the first working area to run based on the first fan operation frequency;
adjust the frequency of the PWM controller to the second fan operation frequency and drive a fan arranged in the second working area to run based on the second fan operation frequency;
adjust the frequency of the PWM controller to the third fan operation frequency and drive a fan arranged in the third working area to run based on the third fan operation frequency; and
adjust the frequency of the PWM controller to the fourth fan operation frequency and drive fans arranged in the first working area, the second working area, and the third working area to run based on the fourth fan operation frequency.

11. The electronic device of claim 9, wherein the at least one processor is further configured to:
preset a plurality of fan stop frequencies, wherein each of the plurality of fan stop frequencies corresponds to different working areas;
receive a fan stop request and adjust the frequency of the PWM controller to a second objective frequency based on the fan stop request, wherein the second objective frequency is one of the plurality of fan operation frequencies; and
send the second objective frequency to the plurality of fans to stop a second fan of the plurality of fans, wherein the second fan is arranged in a second objective working area, and the second objective working area is one of the plurality of working areas corresponding to the second objective frequency.

12. The electronic device of claim 9, wherein the at least one processor is further configured to:
send a predetermined query frequency to the first fan; and
receive an objective parameter frequency returned by the first fan responding the predetermined query frequency, wherein the objective parameter frequency is configured to represent an operating parameter of the first fan arranged in the first objective working area.

13. The electronic device of claim 12, wherein the operating parameter comprises N categories, and N is an integer greater than 1, the predetermined query frequency comprises N query frequencies, each of the N query frequencies corresponds to one category of operating parameter, and the at least one processor is configured to receive the objective parameter frequency returned by the first fan responding the predetermined query frequency, is further configured to:
receive the objective parameter frequency returned by the first fan, wherein the operating parameter represented by the objective parameter frequency corresponds to the predetermined query frequency.

14. The electronic device of claim 13, wherein the at least one processor is configured to receive the objective parameter frequency returned by the first fan, is further configured to:
generate a first frequency band by the first fan based on a category of the operating parameter corresponding to the predetermined query frequency;
generate a second frequency band by the first fan based on an operating parameter data of the first fan under the category; and
generate the objective parameter frequency by the first fan based on the first frequency band and the second frequency band, and sending the objective parameter frequency to the control device.

15. The electronic device of claim 13, wherein the categories of operating parameter are selected from a group consisting of a current, a voltage, a power, a company name, a product model, a running time, a fault code, a temperature, and a program version.

* * * * *